No. 12,492. REISSUED JUNE 5, 1906.
C. F. METHFESSEL & W. J. HARTSON.
METALLIC CORD FASTENER.
APPLICATION FILED DEC. 12, 1905.
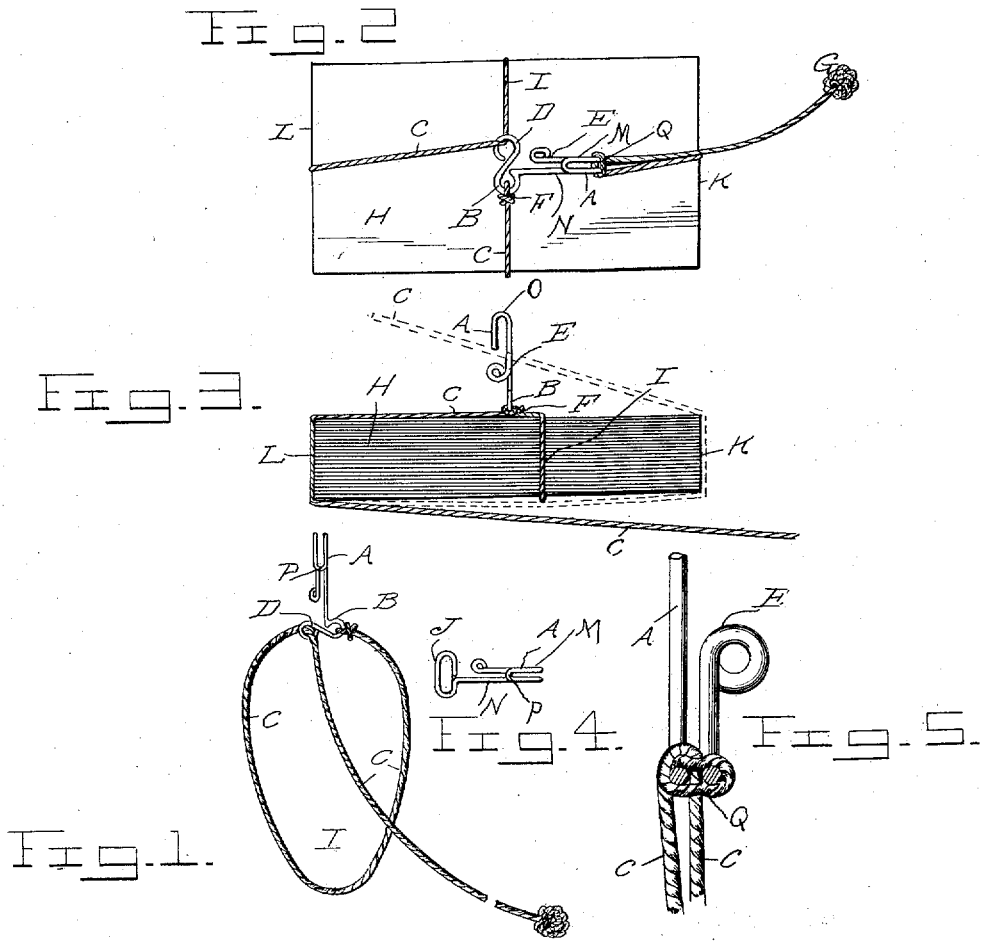
Witnesses
A. M. Simpson
F. C. Jones
Inventors
C. F. Methfessel
W. J. Hartson
By Bartlett & Bartlett
Attorneys
ANDREW B. GRAHAM CO., PHOTO-LITHOGRAPHERS, WASHINGTON, D. C.

UNITED STATES PATENT OFFICE.

CHARLES F. METHFESSEL AND WILLIAM J. HARTSON, OF MILWAUKEE, WISCONSIN, ASSIGNORS OF ONE-THIRD TO FRANCIS H. WHITNEY, OF MILWAUKEE, WISCONSIN.

METALLIC CORD-FASTENER.

No. 12,492. Specification of Reissued Letters Patent. Reissued June 5, 1906.

Original No. 785,749, dated March 28, 1905. Application for reissue filed December 12, 1905. Serial No. 291,667.

*To all whom it may concern:*

Be it known that we, CHARLES F. METHFESSEL and WILLIAM J. HARTSON, citizens of the United States, residing at Milwaukee, county of Milwaukee, and State of Wisconsin, have invented new and useful Improvements in Metallic Cord-Fasteners, of which the following is a specification.

Our invention relates to improvements in package-holders; and it pertains to the device for forming a slip-noose with a cord around a package and to the device for securing and quickly fastening the cord after it has been placed around the package.

The object of our invention is to provide a package-holder and cord-fastener which is adapted to be repeatedly used for tying packages and which is more especially adapted to be used with packages of mail-matter where a large number of the packages are of substantially the same size, in which case the cords and fasteners received on the incoming mail may be used on the outgoing mail, whereby the expense of procuring new cords for such packages and the waste arising from cutting such cords and the wear incident to tying and untying them when used as heretofore in the ordinary way is avoided, and said cords may be used a much greater length of time than heretofore, while owing to the fact that said cord and fastener as secured together form a permanent slip-noose the same may be more quickly placed around the package as well as more quickly tied and more quickly untied.

The construction of our invention is further explained by reference to the accompanying drawings, in which—

Figure 1 represents a perspective view of a loop formed by the cord and fastener preparatory to being placed around the package. Fig. 2 represents a top view of a package provided with our fastener. Fig. 3 represents a side view of a package, showing the position of the fastener thereon as the cord is being drawn longitudinally beneath the package after the package has first been secured by the transversely-arranged slip-noose, the dotted lines above the package indicating the position of the cord preparatory to drawing it into the primary hook of the fastener. Fig. 4 represents a top view of a modified form of hook in which a single loop is formed for the reception of both the end of the cord, which is permanently tied thereto, and for the reception of the slip-noose; and Fig. 5 is a detail showing the manner of tying the fastening-knot which is formed by the coöperation of the cord and fastening-hook interlocked together, a portion of the primary hook of the fastener being removed to show the position of the folds of the cord beneath it.

Like parts are identified by the same reference-letters throughout the several views.

The cord-fastener comprises the primary hook A, the cord-retaining loop B, to which the cord C is permanently attached by the knot F, the noose-retaining loop D, in which the cord is permanently retained, and the fastening-hook E, in which the end of the cord after it has been folded around the primary hook is finally secured. The cord C is permanently secured to the loop B by the knot F or in any other convenient manner, and the free end of the cord is prevented from being withdrawn from the loop D by the knot G.

As will be apparent from the drawings, the cord-fastener is formed of a single strip of wire bent upon itself to form the spaced members M and N, connected by the bight portion O. The lower member N may be regarded as the stem of the fastener, while the upper member M forms its bill. Owing, however, to the formation of the fastener from a single wire strip, both the stem and bill thereof are double, and it will be seen therefore that the entire fastener may be regarded as being composed of two slightly-separated strands extending from the free end of the stem to the end of the bill, the two members formed by said strands being connected by the bight P, this construction being plainly shown in Figs. 1, 3, and 4.

H represents an ordinary package of mail-matter to which the cord is secured.

Attention is directed to the fact that the loops B and D of the fastener and the single loop J thereof (shown in Fig. 4) are formed at right angles to the plane of the hook, and the intermediate portion of the cord is passed through the loop or one of the loops from beneath and then extended rearwardly over the material of which the loop is formed, whereby as the noose I is tightened around the package the tension of the fastening-cord C has the effect to throw the hook A in the vertical position, (shown in Fig. 3,) in which position it is readily caught by the cord C in the act of securing the same around the package. While the loops B and D are preferably formed separately, as indicated in Fig. 2, by an S-shaped bend given to the wire, as shown in said figure, (thereby lessening the liability of the cord becoming tangled,) the single loop J may be substituted therefor, as indicated in the modified form shown in Fig. 4.

It will be understood that in tying a package the noose I is first thrown over the end of the package, when it is drawn firmly around the center of the package, as indicated in Figs. 2 and 3, the package being held in the left hand and the end of the cord in the right hand, the end of the package K being held toward the person who is placing the fastener upon it. The free end of the cord is then drawn forwardly over and around the opposite end L of the package, when it is drawn rearwardly and then brought upwardly and forwardly around the hook A, as indicated in Fig. 3. By thus drawing upon the cord the free end of the fastener is thrown to the vertical, as indicated in said Fig. 3, whereby the cord is readily thrown around and drawn into the hook A from the left toward the right, when said hook is drawn from the vertical to the horizontal position, as indicated in Fig. 2, with the cord beneath the primary hook A. The thumb of the left hand is then placed upon the cord to prevent it from slipping, while the free end of the cord is drawn around and into the fastening-hook E, whereby it is secured in place and prevented from untying. Thus it will be obvious that in a knot thus formed the folds of the cord coöperate with the bends of the hooks of the fastener to form a secure knot. When the cord is thus secured, the package may be carried by or suspended from the free end of the cord without liability of the knot becoming accidentally disengaged.

It will be noted upon reference to Figs. 2 and 5 of the drawings that when the cord is engaged with the hook A the free end portion thereof is in the rear of the knot Q. When, however, it is desired to untie the package, it is necessary simply to draw the free end of the cord forwardly toward the tip of the bill of the fastener, which action will cause the knot or folds of the cord to slide down said bill and finally off over its free end, whereby the folds of the cord are readily withdrawn therefrom and the cord is released from the package. It will also be obvious that by thus forming a permanent slip-knot in the cord by passing the same through the loop D the cord may be firmly drawn around the package without drawing one portion of the cord upon the other, whereby the liability of the cords becoming cut and worn at the point of crossing, as is otherwise frequently the case at such point, is avoided. Thus the noose not only facilitates the rapid tying of the package, but prolongs the life of the fastening-cords by preventing the wear to which they would otherwise be subject at the point of crossing, while the cord-retaining hooks, by which the end of the cord is secured, also facilitate in tying and untying the knot, as both operations are much more speedily performed than could be done by ordinary methods, while a cord secured by this device can always be readily untied and the necessity of cutting the knots or cords, as is frequently the case with knots formed in the ordinary way, is entirely overcome.

Having thus described our invention, what we claim as new, and desire to secure by Letters Patent, is—

1. In a package-holder, the combination of a fastening-cord and a metallic cord-fastener having fixed connection with one end of the cord and loose engagement with the intermediate portion thereof, said cord-fastener being also provided with a primary hook adapted to loosely receive the cord and a device coöperative with the primary hook for locking the cord in position therein.

2. In a package-holder, the combination of a fastening-cord and a metallic cord-fastener having fixed connection with one end of the cord and loose engagement with the intermediate portion thereof, said cord-fastener being also provided with a primary hook adapted to loosely receive the cord, and a fastening-hook arranged to coöperate with the primary hook in securing the cord thereto.

3. In a package-holder, a metallic cord-fastener comprising a loop for the permanent attachment of one end of the fastening-cord; a separate loop for the reception of a slip-noose formed by the intermediate portion of the cord; a primary hook through which the cord is drawn preparatory to being tied and a fastening-hook for the reception of the end of the cord when tied, in combination with a fastening-cord permanently attached at one end to said cord-retaining loop, having its intermediate portion slidably connected with said noose-retaining loop, and means for preventing the free end of said cord from being withdrawn from said noose-retaining loop, all substantially as and for the purpose specified.

4. In a package-holder, the combination of a fastening-cord, a primary hook adapted to loosely engage the cord and provided with a shank having fixed connection with one end of the cord and a loop in loose engagement with the intermediate portion thereof; a fastening-hook having its free end extended along the shank of the primary hook and provided with an outwardly-curving extremity, said fastening-hook being arranged to permit an initial independent engagement of the cord in the primary hook.

5. In a package-holder, the combination of a fastening-cord and a metallic cord-fastener comprising a primary hook having a shank provided with a loop in a plane substantially at right angles to the plane of the primary hook; said cord having one end permanently connected with the shank and an intermediate portion extending from said fixed end loosely through said loop from beneath and forming a slip-noose; said primary hook being adapted to loosely receive the cord and provided with means for locking the cord in position therein.

6. The combination of a fastening-cord and a cord-fastener comprising a wire bent upon itself to form spaced members and a connecting-bight, one of said spaced members being longer than the other and having said fastening-cord attached thereto, said spaced members being bent at points adjacent to said bight to form the bill of the hook.

7. A cord-fastening hook comprising a stem, a bight, and a bill, the hook being composed of two slightly-separated strands extending from the free end of the stem to the end of the bill, and the resultant sides of the stem and bill being in spaced relation to permit the passage of a cord therebetween, the free end portion on one side of the stem being longer than the other and having a cord attached at its extremity.

In testimony whereof we affix our signatures in presence of two witnesses.

CHARLES F. METHFESSEL.
WILLIAM J. HARTSON.

Witnesses:
EUGENE HAAS,
FRED A. RHEINFRANK.